United States Patent [19]
Hagiwara et al.

[11] Patent Number: 4,781,888
[45] Date of Patent: Nov. 1, 1988

[54] ALUMINUM BRAZING MATERIAL FOR USE IN ALUMINUM HEAT EXCHANGER

[75] Inventors: Michiki Hagiwara; Keizo Nanba, both of Nagoya; Shosuke Iwasaki, Kobe; Tetsuo Abiko, Osaka, all of Japan

[73] Assignee: Sumitomo Precision Products Co., Ltd., Amagasaki, Japan

[21] Appl. No.: 720,217

[22] Filed: Apr. 5, 1985

[30] Foreign Application Priority Data

Jul. 31, 1984 [JP] Japan ................................ 59-158678

[51] Int. Cl.⁴ .............................................. C22C 21/10
[52] U.S. Cl. ................................ 420/531; 228/263.17; 420/537; 420/540; 420/546; 420/549; 428/654
[58] Field of Search ............... 420/531, 546, 537, 549, 420/540; 148/404; 428/654; 228/263.17

[56] References Cited

U.S. PATENT DOCUMENTS

| | | | |
|---|---|---|---|
| 1,657,389 | 1/1928 | Gwyer et al. | 420/549 |
| 3,843,333 | 10/1974 | Woods | 428/654 |
| 4,068,645 | 1/1978 | Jenkinson | 148/404 |

*Primary Examiner*—R. Dean
*Attorney, Agent, or Firm*—Flynn, Thiel, Boutell & Tanis

[57] ABSTRACT

Aluminum brazing alloys for assembling aluminum heat exchangers by brazing which consist essentially of 4.5 to 13.5% of Si, 0.05 to 0.5% of Ca and the balance essentially Al and, additionally may contain Mg in the range of 0.3 to 3.0% or at least Cu component of 2.3 to 4.7% of Cu and 9.3 to 10.7% of Zn. The aluminum brazing alloys have an excellent brazability and provide high strength brazed joints with highly refined microstructure. Such superior properties make the brazing alloys especially suited for the fabrication of superhigh pressure heat exchangers.

10 Claims, 2 Drawing Sheets

ALUMINUM BRAZING MATERIAL FOR USE IN ALUMINUM HEAT EXCHANGER

BACKGROUND OF THE INVENTION

The present invention relates to aluminum brazing alloys for assembling aluminum heat exchangers, especially suited for assembling plate fin heat exchangers adapted for superhigh pressure service by brazing.

Plate fin heat exchangers made of aluminum have been heretofore fabricated by means of an appropriate brazing technique such as vacuum brazing, atmospheric brazing or dip brazing, wherein aluminum brazing alloys containing 4.5 to 13.5% Si and optionally, the addition of less than 3% Mg, or 2.3 to 4.7% Cu and 9.3 to 10.7% Zn have been commonly employed. The above-mentioned silicon containing brazing alloys may further contain Be and Bi. Throughout the present specification, percentages are by weight unless otherwise indicated.

Superhigh pressure service plate fin heat exchanger is specified by the rupture pressure when the heat exchanger is ruptured due to the internal pressure. Strength at brazed joint portions is regarded as a dominant factor of the rupture pressure and the strength mainly depends on the width of the fillet and the structure in the brazed joint portions. However, in the fabrication of large scale heat exchangers, a prolonged brazing time does not permit a sufficiently wide fillet and, thus, the currently used heat exchangers exhibit a low rupture pressure.

On the other hand, in general, the metallurgical structure of the brazed portion can be refined by increasing the cooling rate after brazing, whereby the strength can be increased. However, practically, it is impossible to increase adequately the cooling rate in the construction of the large-sized heat exchangers and, thus, refinement of the structure cannot be achieved. For the foregoing reasons, improvement in rupture pressure can not be expected in the prior art.

SUMMARY OF THE INVENTION

It is therefore an object of the present invention to provide improved aluminum brazing alloys free of the foregoing disadvantages encountered in the prior art and more particularly to provide aluminum brazing alloys highly useful in assembling aluminum heat exchangers, especially in plate fin heat exchangers intended for use under superhigh pressures, by brazing process.

According to the present invention, there are provided an aluminum brazing alloy consisting essentially of 4.5 to 13.5% of Si, 0.05 to 0.5% of Ca and the balance essentially aluminum and further a second aluminum brazing alloy containing Mg in an amount of 0.3 to 3.0% in addition to the above composition. Still further, as a third aluminum brazing alloy, Cu in amount of 2.3 to 4.7% can be also added singly or in combination of 9.3 to 10.7% of Zn to the first composition. The aluminum brazing alloys of the present invention develop a very refined metallurgical structure in the brazed joints by utilizing ordinary brazing techniques, such as vacuum brazing, atmospheric brazing or dip brazing, whereby significantly improving both of the strength of the brazed joints and brazability.

BRIEF DESCRIPTION OF THE DRAWINGS

FIGS. 1 and 2 are micrographs showing metallurgical structure of the brazed portions at cross-shaped joints brazed in the testing procedures described in Example 1, wherein FIG. 1 is for the brazing sheet utilizing the aluminum brazing alloy of the present invention as a cladding and FIG. 2 for the brazing sheet utilizing a comparative brazing alloy as a cladding;

DETAILED DESCRIPTION OF THE PREFERRED EMBODIMENTS

The present invention resides in the aluminum brazing alloys highly suited for aluminum heat exchangers, the alloys having compositions specified below:

(1) An aluminum brazing alloy consisting essentially of 4.5 to 13.5% of Si, 0.05 to 0.5% of Ca and the balance essentially Al.

(2) An aluminum brazing alloy consisting essentially of 4.5 to 13.5% of Si, 0.05 to 0.5% of Ca, 0.3 to 3.0% of Mg and the balance essentially Al.

(3) An aluminum brazing alloy consisting essentially of 4.5 to 13.5% of Si, 0.05% to 0.5% of Ca, a Cu component of 2.3 to 4.7% of Cu or 2.3 to 4.7% of Cu and 9.3 to 10.7% of Zn and the balance essentially Al.

Now, the function of each alloying component of the foregoing aluminum brazing alloys (1) to (3) and the reason why each component is limited to the content specified above will be described below.

Si: This component is a main alloying component and advantageously reduces the melting point of brazing alloys, whereby providing a significant improvement in flowability. A Si content of under 4.5% unfavorably reduces the flowability and presents difficulties in brazing operation. On the other hand, a Si content of more than 13.5% can not provide a sufficient plasticity, and thereby presents difficulties in working process.

Ca: This component provides a beneficial structure refining effect, thereby improving the strength of the brazed joint portion. Additionally, Ca exhibits an effect in improving brazability. However, when the Ca content is less than 0.05%, these effects are not sufficiently obtained, while a content of over 0.5% will unfavorably affect brazability.

Mg: Mg makes it possible to braze in a vacuum or non-oxidizing atmosphere without requiring the use of flux. With a content of Mg of less than 0.3%, the effect can not be sufficiently attained, while an excess Mg content of over 3.0% causes an excessive volatilization of Mg and, thus, the furnace used will be considerably polluted due to the adherence of volatilized Mg.

Cu: Cu reduces the melting point of brazing alloys and improves their brazability. When Cu is present in an amount of less than 2.3%, the functions are insufficient, while a Cu content exceeding 4.7% will adversely affect brazability.

Zn: Zn enhances the effect of Cu set forth above. A Zn content of less than 9.3% can not provide the effect at a sufficient level. On the other hand, an excess Zn content of more than 10.7% will detrimentally affect brazability.

The examples of the present invention will now be described in detail hereinbelow with reference to the comparative examples.

EXAMPLE 1

Figure 3:
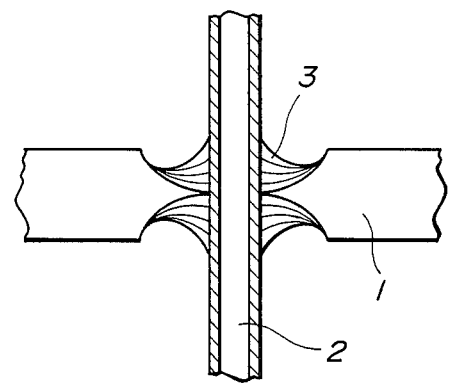
FIG. 3 is an illustrative vertical cross-sectional view of the above cross-shaped brazed joint.

As shown in FIG. 3, a brazing sheet No. 1 was disposed between 3.3 mm thick AA3003 aluminum sheets in order to assemble a cross-shaped joint having a Kshaped groove, a root face width of 0 and a groove angle of 45° and then brazed in a vacuum of $2 \times 10^{-5}$ mmHg by heating at 600° C. for three minutes and at 600° C. for one hour, respectively. The brazing sheet No. 1 used here had a total thickness of 1.6 mm and was composed of a core of AA3003 alloy and claddings which were made of Al-10% Si-1.5% Mg-0.15% Ca brazing alloy and bonded to both surfaces of the core at a cladding ratio of 10%. Similarly, a comparative cross-shaped joint was assembled using a brazing sheet No. 2 which was made in the same manner as in the brazing sheet No. 1, but omitting Ca from the cladding member, and thereafter, brazed. In FIG. 3, reference numerals 1, 2 and 3 represent an AA3003 aluminum plate, a brazing sheet and a filler layer of the above-mentioned Al-10% Si-1.5% Mg brazing alloy with or without 0.15% Ca. Each cross-shaped brazed joint formed inthe above manner was examined for its microstructure and strength at the brazed joint portion and the results are given in Table 1.

TABLE 1

Results of burst test at brazed joints
(Rupture strength values indicated below are the mean values of five measurements.)

| Brazing sheet No. | 600° C. × 3 min. | | 600° C. × 1 hr. | |
|---|---|---|---|---|
| | Ruptured portion | Rupture strength at brazed portion (kg/mm²) | Ruptured portion | Rupture strength at brazed portion (kg/mm²) |
| 1 (containing 0.15% Ca) | Base metal | not less than 10.6 | Base metal | not less than 8.8 |
| 2 Ca-free | Brazed portion | 8.3–9.4 | Brazed portion | 6.7–8.0 |

Figure 1:
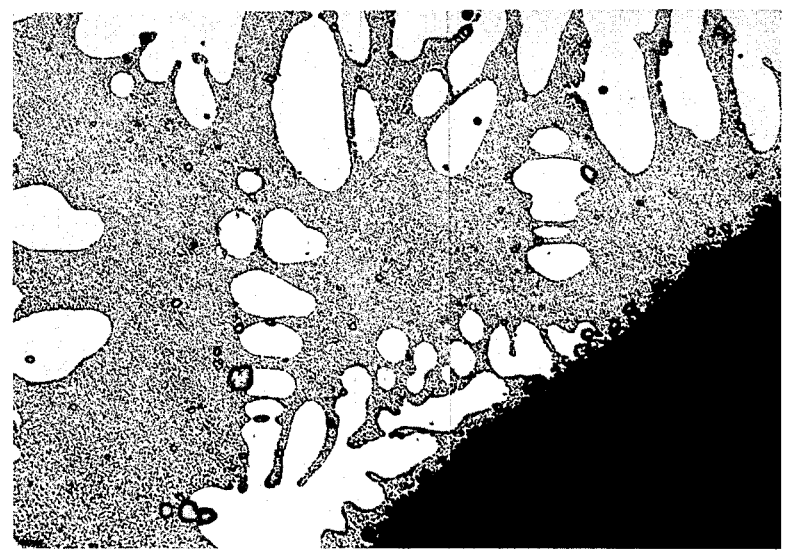
Figure 2:
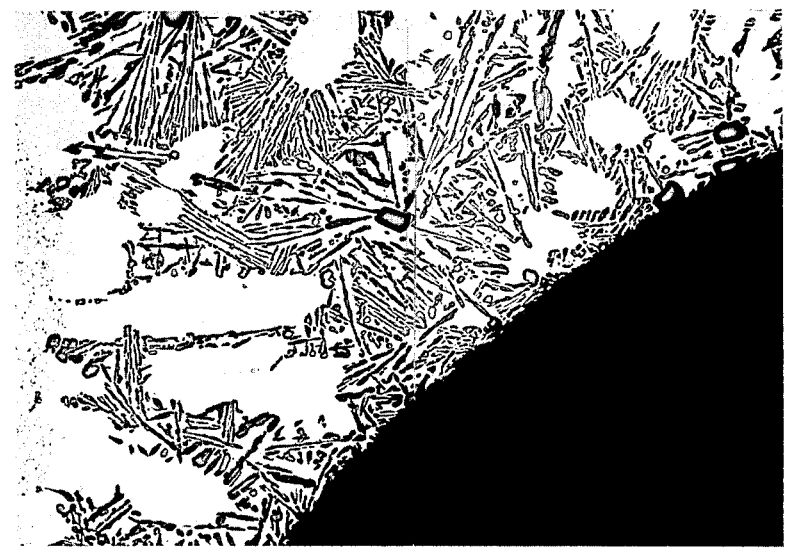

Brazing sheet
Sheet thickness: 1.6 mm
Core material: AA3003
Cladding base composition: Al-10% Si-1.5% Mg FIGS. 1 and 2 are micrographs (×100) showing the microscopic structures at brazed joint portions for the brazing sheet No. 1 and the brazing sheet No. 2, respectively. FIG. 1 reveals a refined eutectic structure, whereas FIG. 2 shows a coarse eutectic structure.

EXAMPLE 2

Figure 4:
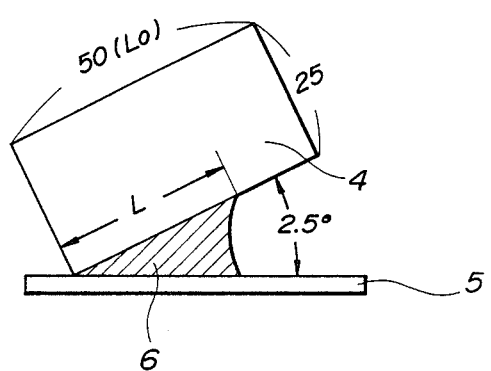
FIG. 4 is an illustrative view of a test specimen for clearance-filling test.

Each of 1 mm thick brazing sheets having claddings, made of respective alloys given in Table 2 below, on both sides thereof at a cladding ratio of 10% was combined with an AA3003-O alloy sheet to prepare a test piece in the arrangement shown in FIG. 4 and clearance-filling test was carried out on each test piece in order to examine brazability. The test results are presented in Table 2. In FIG. 4, reference numerals 4, 5 and 6 represent a brazing sheet, 50 mm×25 mm in size and 1 mm in thickness, an AA3003-O aluminum sheet, 60 mm square in size and 1 mm in thickness, and a filler layer of each brazing alloy shown in Table 2, respectively.

TABLE 2

| Brazing sheet No. | Cladding (Brazing alloy) composition in brazing sheet | | Filling rate L/Lo × 100(%) | Appearance of brazed portion | Brazing conditions |
|---|---|---|---|---|---|
| | Main composition | Addition amount of Ca | | | |
| *3 | Al-10% Si-1.5% Mg (corres. to AA4004) | 0 | 74 | Good | Vacuum brazing (fluxless) in a vacuum of 2 × 10⁻⁵ mmHg at 600° C. for 3 mins. |
| 4 | Al-10% Si-1.5% Mg (corres. to AA4004) | 0.08% | 76 | " | |
| 5 | Al-10% Si-1.5% Mg (corres. to AA4004) | 0.15% | 72 | " | |
| 6 | Al-10% Si-1.5% Mg (corres. to AA4004) | 0.40% | 73 | " | |
| *7 | Al-10% Si-1.5% Mg (corres. to AA4004) | 0.82% | 35 | Occurrence of cavities | |
| *8 | Al-10% Si (corres. to JIS BA4045) | 0 | 77 | Good | Furnace brazing (using flux) in air at 600° C. for 3 mins. |
| 9 | Al-10% Si (corres. to JIS BA4045) | 0.08% | 75 | " | |
| 10 | Al-10% Si (corres. to JIS BA4045) | 0.15% | 73 | " | |
| 11 | Al-10% Si (corres. to JIS BA4045) | 0.40% | 78 | " | |
| *12 | Al-10% Si (corres. to JIS BA4045) | 0.82% | 41 | Occurrence of cavities | |
| *13 | Al-10% Si-4% Cu (corres. to JIS BA4145) | 0 | 78 | Good | Furnace brazing (using flux) in air at 580° C. for 3 mins. |
| 14 | Al-10% Si-4% Cu (corres. to JIS BA4145) | 0.08% | 77 | " | |

TABLE 2-continued

| Brazing sheet No. | Cladding (Brazing alloy) composition in brazing sheet | | Filling rate L/Lo × 100(%) | Appearance of brazed portion | Brazing conditions |
|---|---|---|---|---|---|
| | Main composition | Addition amount of Ca | | | |
| 15 | Al-10% Si-4% Cu (corres. to JIS BA4145) | 0.15% | 76 | " | |
| 16 | Al-10% Si-4% Cu (corres. to JIS BA4145) | 0.40% | 74 | " | |
| *17 | Al-10% Si-4% Cu (corres. to JIS BA4145) | 0.82% | 43 | Occurrence of cavities | |
| *18 | Al-10% Si-4% Cu-10% Zn | 0 | 76 | Good | Furnace brazing (using flux) in air at 560° C. for 3 mins. |
| 19 | Al-10% Si-4% Cu-10% Zn | 0.08% | 75 | " | |
| 20 | Al-10% Si-4% Cu-10% Zn | 0.15% | 77 | " | |
| 21 | Al-10% Si-4% Cu-10% Zn | 0.40% | 73 | " | |
| *22 | Al-10% Si-4% Cu-10% Zn | 0.82% | 45 | Occurrence of cavities | |

Brazing sheet
Sheet thickness: 1 mm, Core material: AA3003
*Comparative brazing sheets Further, brazing sheets No. 8 and No. 9 given in the above Table 2 were each combined with an AA3003 aluminum sheet to form a cross-shaped brazed joint as in the same manner set forth in Example 1 and then brazed in air by heating at 600° C. for 30 minutes. Thereafter, the brazed joints were subjected to the burst test and the test results are given in Table 3.

TABLE 3

Results of burst test at brazed joints
(Rupture strength values indicated below are the mean values of five measurements.)

| Brazing sheet No. | Ruptured portion | Rupture strength at brazed portion (kg/mm$^2$) |
|---|---|---|
| 8 (Ca-free) | Brazed portion | 8.3–9.2 |
| 9 (containing Ca) | Base metal | not less than 10.6 |

As shown in FIG. 1, the aluminum brazing alloys of the present invention develop a highly refined structure at brazed joint portions by any commonly practiced brazing process, for example, vacuum brazing, atmospheric brazing or dip brazing, thereby, as manifested in the experimental results given above, provide high strength brazed joints as compared to conventional aluminum brazing alloys including Al-Si, Al-Si-Mg and Al-Si-Cu or Al-Si-Cu-Zn brazing alloy and eliminate the breakage or rupture problems due to internal pressure or other destructive force. Further, the aluminum brazing alloys exhibit excellent brazability.

Such superior properties render the aluminum brazing alloys of the present invention highly suited for assembling aluminum heat exchangers, especially plate fin heat exchangers for superhigh pressure service by brazing.

What is claimed is:

1. An aluminum brazing material used for assembling an aluminum heat exchanger by brazing, said aluminum brazing material consisting essentially of 4.5 to 10% of Si, 0.21 to 0.5% of Ca and balance essentially aluminum.

2. An aluminum brazing material used for assembling an aluminum heat exchanger by brazing, said aluminum brazing material consisting essentially of 4.5 to 10% of Si, 0.08 to 0.5% of Ca, 0.3 to 3.0% of Mg and balance essentially aluminum.

3. An aluminum brazing material used for assembling an aluminum heat exchanger by brazing, said aluminum brazing material consisting essentially of 4.5 to 10% of Si, 0.05 to 0.5% of Ca, 2.3 to 4.7% of Cu and the balance essentially aluminum.

4. A brazing material as claimed in claim 2 consisting of about 10% Si, about 1.5% Mg, from 0.08 to 0.50% Ca, the balance being aluminum.

5. A brazing material as claimed in claim 3 consisting of about 10% Si, about 4% Cu, from 0.05 to 0.50% Ca, the balance being aluminum.

6. A brazing material as claimed in claim 3 consisting of about 10% Si, about 4% Cu, about 10% Zn, from 0.05 to 0.50% Ca, the balance being aluminum.

7. A brazing method which comprises: brazing aluminum structural members using as a filler, an aluminum brazing material as claimed in claim 1.

8. A brazing method which comprises: brazing aluminum structural members using as a filler, an aluminum brazing material as claimed in claim 2.

9. A brazing method which comprises: brazing aluminum structural members using as a filler, an aluminum brazing material as claimed in claim 3.

10. An aluminum brazing material used for assembling an aluminum heat exchanger by brazing, said aluminum brazing material consisting essentially of 4.5 to 10% of Si, 0.05 to 0.5% of Ca, 2.3 to 4.7% of Cu and 9.3 to 10.7% of Zn and the balance essentially aluminum.

* * * * *